United States Patent [19]

Himmelsbach

[11] Patent Number: 4,595,502

[45] Date of Patent: Jun. 17, 1986

[54] PILE COMPRISING A PLURALITY OF FILTER PAPER SHEETS WITH RECESSES

[76] Inventor: Fritz Himmelsbach, Artherstrasse 163, 6317 Oberwil, Switzerland

[21] Appl. No.: 686,665

[22] Filed: Dec. 27, 1984

Related U.S. Application Data

[63] Continuation of Ser. No. 541,011, Oct. 12, 1983, abandoned.

[30] Foreign Application Priority Data

Oct. 12, 1982 [DE] Fed. Rep. of Germany ....... 3237702

[51] Int. Cl.⁴ .............................................. B01D 35/02
[52] U.S. Cl. .................... 210/483; 210/488; 210/493.5; 206/499; D7/400
[58] Field of Search ................. 210/474, 497.9, 497.2, 210/483, 488, 493.5, 492, 500.1; 206/217, 499, 515, 519; 426/77; 55/500; 220/406; 221/309, 310; D7/400

[56] References Cited

U.S. PATENT DOCUMENTS

| | | | |
|---|---|---|---|
| 979,381 | 12/1910 | Conery, Jr. | 206/499 |
| 1,356,662 | 10/1920 | Sherman | 206/499 |
| 1,745,929 | 2/1930 | Grimmeisen | 206/499 |
| 2,324,440 | 7/1943 | Tormohlen | 206/499 |
| 3,363,406 | 1/1968 | Miller | D7/400 |
| 4,220,541 | 9/1980 | Chang | 210/497.2 |
| 4,362,623 | 12/1982 | Holopainen | D7/400 |

*Primary Examiner*—Marc Louis Caroff
*Assistant Examiner*—Wanda L. Millard
*Attorney, Agent, or Firm*—A. A. Saffitz

[57] ABSTRACT

If a plurality of essentially circular sheets of filter paper are stacked in a pile, the individual sheets have a tendency to stick to each other rendering it difficult to remove the topmost sheet from the pile. To overcome this inconvenience, it is provided that adjacent sheets within the pile have a different contour, e.g. by providing every second sheet with a protruding tongue arranged at the circumferential edge thereof. All the intermediate sheets either do not have such tongue or are provided with a recess arranged anywhere along their circumferential edge.

1 Claim, 6 Drawing Figures

PILE COMPRISING A PLURALITY OF FILTER PAPER SHEETS WITH RECESSES

This is a continuation, of application Ser. No. 541,011, filed Oct. 12, 1983, now abandoned.

FIELD OF THE INVENTION

The present invention refers to a pile comprising a plurality of filter paper sheets, particularly to a pile of filter inserts useful in preparing coffee or similar beverages and which have a symmetrical shape with reference to a central symmetry point, e.g. an essentially circular or similar shape.

Filter paper inserts of the kind described above, usually being in the form of a single, circular sheet of filter paper material, are widely used in coffee brewing or similar machines, either to be commercially used in restaurants or to be privately used in the household. Sometimes such filter sheet inserts are formed to a certain shape, depending on the brewing machine to be used, e.g. to a cup-like shape. Such filter sheet inserts are packed in piles into a carton, each pile comprising 50 or 100 sheets. Usually the stacking-up of the individual sheets to form a pile is performed immediately after punching-out the individual sheets and the pile is often strongly pressed together to be placed in the carton. If a further shaping is desired, e.g. into the above mentioned cup-like shape, this is usually performed pile-wise, i.e. the individual flat sheets are stacked to a pile of, let's say, 50 flat sheets and the completed pile is shaped into the desired final form.

As the filter sheet inserts are punched-out to the desired shape they are subjected to a very high relative pressure along their circumferential edge. The succeding stacking process to form the pile and the subsequent compression to pack the pile into a carton, where it may remain as long as several months, results in diffuculties occuring during removal of the topmost sheet from the pile, as the individual sheets in the pile show the tendency to stick together. Therefore it may be most troublesome to separate and remove the uppermost filter paper sheet for placing it into the coffee brewing machine. These difficulties are extremely pronounced if the pile of sheets has been shaped to a cup-like or similar form. Thereby it is necessary to exert a high pressure on the pile to realize the desired shaping; this high pressure however favors the danger that the individual filter inserts stick together in a very undesireable manner.

OBJECTS OF THE INVENTION

It is an object of the present invention to solve the aforementioned problems and to provide a pile of filter paper sheets of the kind mentioned above in which the topmost sheet may be removed without any difficulty. A further object of the present invention is to provide a pile of filter paper sheets which can be stacked-up, either during the punching operation of the individual sheets or thereafter, in a straight-forward way without the need of any additional equipment or additional operation steps.

SUMMARY OF THE INVENTION

The pile comprises a plurality of sheets of filter paper. Each sheet has a central symmetry point and its shape is essentially symmetrical with reference to said central symmetry point. Preferably the sheets have a circular or a similar shape. This plurality of sheets is coaxially arranged in this pile with reference to a central symmetry axis through said central symmetry points, whereby adjacent sheets in said pile exhibit different outer contours with reference to their position within said pile.

Directly adjacently arranged sheets within said pile may comprise a different shape and/or a different size. In a first embodiment, the pile may comprise first sheets having a first shape and second sheets having a second shape alternatingly arranged within said pile. Said first sheets having said first shape and said second sheets having said second shape have identical size, and said second sheets having said second shape comprise a tongue protruding from the circumferential edge of said second sheets. Another embodiment may provide that said first sheets having said first shape comprise a recess arranged at the circumferential edge of said first sheets.

According to a further embodiment, there may be provided that all sheets within the pile have identical shape, adjacent sheets within the pile being arranged in angularly different positions, offset to each other with reference to said common central symmetry axis. In this embodiment, all sheets within the pile comprise an outwardly protruding tongue arranged along the circumferential edge of each sheet, said tongue of every sheet being located at a different position with reference to the position of the tongues of the two directly adjacent sheets. Another possibility within the disclosure of this second embodiment may be seen in the fact that all sheets within the pile comprise a recess arranged along the circumferential edge of each sheet, said recess of every sheet being located at a different position with reference to the position of the recesses of the two directly adjacent sheets.

BRIEF DESCRIPTION OF THE DRAWINGS

In the following there will be described a number of different embodiments of the pile according to the invention, with reference to the accompanying drawings, in which.

DESCRIPTION OF PREFERRED EMBODIMENTS

Figure 1:
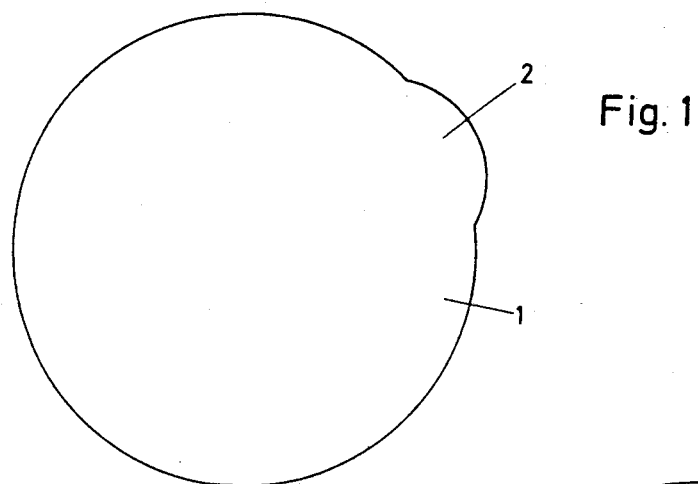
FIG. 1 is a plain view of a filter paper sheet comprising a tongue arranged along the circumferential edge of the filter paper sheet.

In FIG. 1 there is shown an individual filter paper sheet, generally designated with reference numeral 1 and being provided with a tongue 2 arranged at any convenient position along the circumferential edge and protruding therefrom outwardly. The filter paper sheet consists of a material normally used for filter inserts and has a substantially circular shape.

Figure 2:
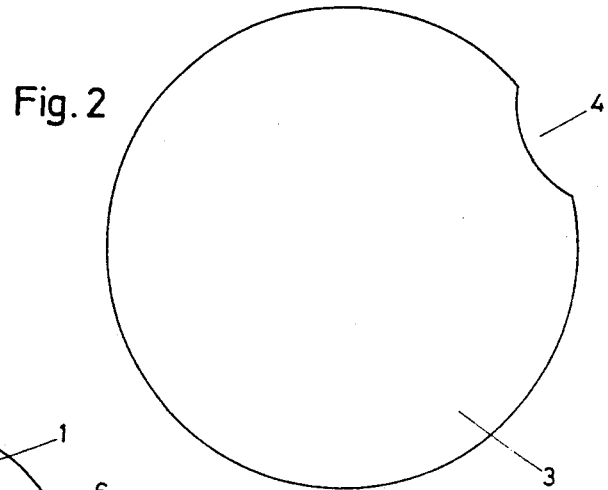
FIG. 2 is a plain view of a filter paper sheet comprising a recess arranged along the circumferential edge of the filter paper sheet.

In FIG. 2 there is shown a similar filter paper sheet 3 as in FIG. 1, with the difference that it does not exhibit a tongue 2, but rather a recess 4 also arranged at any desired position along the circumferential edge.

The size of the tongue 2 and the recess 4, respectively, is preferably about the same as the width of the human thumb, whereby such tongue or such recess doesn't have any influence on the function of the filter paper sheet itself.

Figure 3:
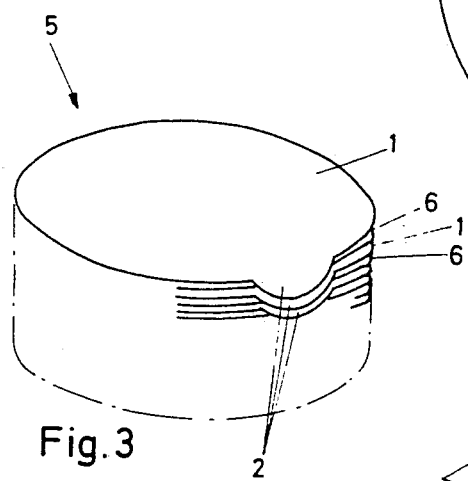
FIG. 3 is a schematic perspective view of a pile of circular filter paper sheets, each second one having the aforementioned tongue.
Figure 3A:
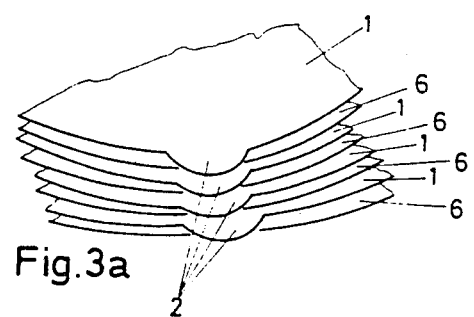
FIG. 3a is an enlarged partial view of the pile of FIG. 3.

The pile shown in FIG. 3 is generally designated with the reference numeral 5 consists of a plurality of individual filter paper sheets, e.g. 50 or 100 pieces, being tightly arranged one above the other one. Alternatingly a first kind of filter paper sheet 1 is provided with a tongue 2, as shown in FIG. 1, and a second kind of filter paper sheet 6 is of circular shape without any tongue or the like. These sheets are stacked alternatingly one above the other one to form the pile 5. For the sake of clarity, FIG. 3a shows an enlarged, partial view of the stack according to FIG. 3, whereby the individual filter paper sheets are shown somewhat more distant to each other than in fact. In practise the individual filter paper sheets are placed tightly one above the other one and have the tendency to stick together.

Accordingly it may be desirable to form a pile consisting alternatingly of individual sheets 3 having a circumferentially arranged recess 4 as shown in FIG. 2 and circular filter paper sheets without any recess 4 or tongues 2. This embodiment should be quite clear and is not shown in the drawings.

In a pile stacked-up in the foregoing described manner the adjacent sheets exhibit different contours with reference to the above mentioned central symmetry axis, even if they substantially have the same or a nearly identical general shape. Therefore the removal of the topmost sheet of filter paper is greatly facilitated.

Figure 4:
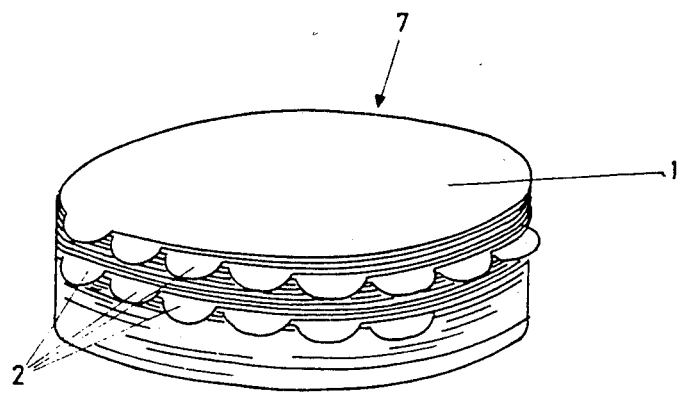
FIG. 4 is a further embodiment of a pile similar to the one shown in FIG. 3.

A further embodiment of a pile of filter paper sheets is shown in FIG. 4, generally designated by reference numeral 7. It consists of a plurality of filter paper sheets 1 incorporating a tongue 2 as shown in FIG. 1. All sheets have an identical shape, but the different contour within the pile 7 is realized by the fact that adjacent sheets 1 in the pile 7 are in angularly different positions with reference to the common central axis of symmetry. Thereby the protruding tongues 2 are arranged at different positions along the circumferential edge of the sheets 1 to facilitate the removal of the topmost sheet of filter paper from the pile 7.

Of course it may be possible to provide an analogous pile, similar to the pile 7 shown in FIG. 4, with a plurality of identical sheets of filter paper which all have a recess disposed somewhere along their circumferential edge, as has been shown in FIG. 2. Accordingly the individual sheets would have to be placed to ensure that the recesses on adjacent sheets don't coincide, i.e. the sheets have to be arranged within the pile with a certain angular offset between adjacent sheets. It is understood that this solution ensures that the topmost sheet may be easily removed from the pile, too.

Figure 5:
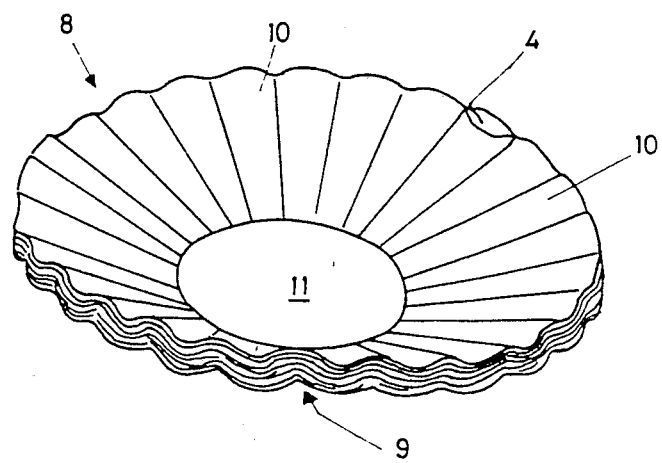
FIG. 5 is a perspective view of a still further embodiment of a pile of filter paper sheets shaped into a cup-like form.
Figure 6:
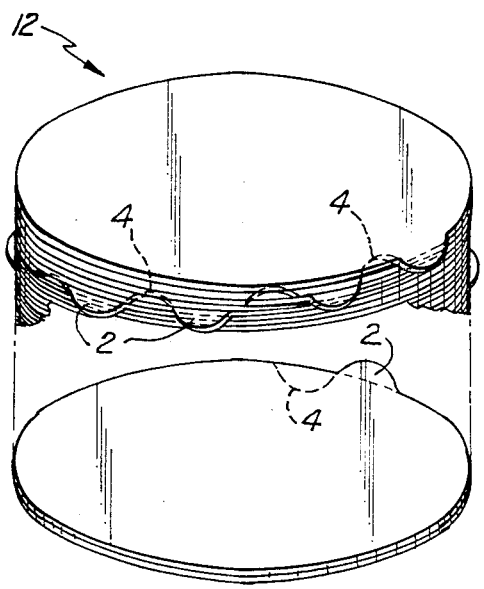
FIG. 6 is a further embodiment of a pile with staggered alternating recesses.

In FIG. 5 there is shown a still further embodiment of a pile of filter paper sheets, the pile being generally designated by reference numeral 8. It consists of a plurality of individual sheets 9 which each have a cup-like shape.

The individual sheets 9 have a shape which is similar to the one shown in FIG. 2, after they have been punched-out and stacked to a pile. However, every second sheet of the pile 8 only is provided with a recess 4. The pile 8 having been stacked-up to the desired height is subjected to a shaping process until each sheet of the pile has a cup-like form comprising an undulated side region 10 and a flat base region 11. It will be promptly understood that the individual sheets stick together quite severely due to the pilewise process shaping and the undulation of the edge region. By providing each second sheet 9 of the pile 8 with a recess 4 a removal of the topmost sheet of the pile is greatly facilitated.

Of course it is possible to provide a pile in an analogous manner with filter paper sheets 1 having a protruding tongue 2, as shown in FIG. 1. The pile thereby comprises alternatingly a sheet equipped with a protruding tongue 2 and a sheet without having such tongue. A still further possibility may be seen in an embodiment of a pile comprising, alternatingly, a sheet 1 equipped with a tongue 2 (FIG. 1) and a sheet 3 having a recess 4 (FIG. 2).

Finally it may be possible to provide a pile comprising a plurality of identically shaped sheets, either provided with a tongue 2 (FIG. 1) or with a recess 4 (FIG. 2). However the sheets will have to be stacked-up in such a way to prevent adjacent sheets to be placed in the same position, i.e. to provide an angularly disposed position of adjacent sheets, offset with reference to the central symmetry axis of the pile.

It will be understood that a number of further variations of the pile within the scope of the present invention is possible. For example, the number and/or the shape of the tongues or the recesses may be varied. A further, interesting embodiment of the pile may comprise a plurality of identically shaped sheets each having circumferentially arranged recesses or tongues, whereby the position of these recesses or tongues is changed by 180 degrees from one sheet to the adjacent one, or a plurality of identically shaped sheets, the size thereof varying from one sheet to the adjacent one by a small amount, e.g. in diameter.

What I claim is:

1. A pile comprising a plurality of coaxially arranged, stacked, cup-like filter sheets of substantially equal size; each filter sheet having a generally flat circular bottom wall and a generally frustoconical undulated side wall; said plurality of sheets including first sheets, the top edge of the frustoconical side wall of said first sheets having a first shape consisting essentially of a recess in the plane of said sheet to facilitate removal, and second sheets, the top edge of the frustoconical side wall of said second sheets having a second shape; said first sheets and said second sheets being alternately arranged within said pile; the second shape of the top edge of the frustoconical side wall being an uninterrupted undulated shape formed by punching, creasing and shaping in the cup portion to provide an edge portion of the cup portion underlying the recess; and each of the recesses in alternating sheets being located in staggered relation in a different position in respect to the top sheet of the pile whereby removal of the sheet with the recess and the underlying sheet at the adjacent recess location is facilitated.

* * * * *